United States Patent
Yang et al.

(10) Patent No.: US 12,300,211 B2
(45) Date of Patent: May 13, 2025

(54) ELECTRONIC DEVICE FOR CONTROLLING AMBIENT SOUND BASED ON AUDIO SCENE AND OPERATING METHOD THEREOF

(71) Applicant: Samsung Electronics Co., Ltd., Suwon-si (KR)

(72) Inventors: Jaemo Yang, Suwon-si (KR); Sangeun Kim, Suwon-si (KR); Seonmi Kim, Suwon-si (KR); Geeyeun Kim, Suwon-si (KR); Hangil Moon, Suwon-si (KR); Junwoo Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 17/991,326

(22) Filed: Nov. 21, 2022

(65) Prior Publication Data

US 2023/0112073 A1    Apr. 13, 2023

Related U.S. Application Data

(63) Continuation of application No. PCT/KR2022/014499, filed on Sep. 27, 2022.

(30) Foreign Application Priority Data

Oct. 13, 2021 (KR) .................. 10-2021-0135951
Dec. 16, 2021 (KR) .................. 10-2021-0180516

(51) Int. Cl.
*G10K 11/16* (2006.01)
*G06F 3/16* (2006.01)
(Continued)

(52) U.S. Cl.
CPC ........ *G10K 11/17827* (2018.01); *G06F 3/165* (2013.01); *G10K 11/17823* (2018.01);
(Continued)

(58) Field of Classification Search
CPC ..... G10K 11/17827; G10K 2210/1081; G10K 2210/3027; G10K 2210/3033;
(Continued)

(56) References Cited

U.S. PATENT DOCUMENTS 8,798,283 B2   8/2014   Gauger, Jr. et al.
10,484,781 B2  11/2019  Rule et al.
(Continued)

FOREIGN PATENT DOCUMENTS

KR   10-1625361 B1    10/2011
KR   10-2012-0034085 A   4/2012
(Continued)

OTHER PUBLICATIONS

International Search Report dated Jan. 4, 2023, issued in International Application No. PCT/KR2022/014499.
(Continued)

*Primary Examiner* — Ammar T Hamid
(74) *Attorney, Agent, or Firm* — Jefferson IP Law, LLP

(57) ABSTRACT

An electronic device is provided. In order to process an ambient sound according to an audio scene, the electronic device receive an ambient sound, determine an audio scene based on the ambient sound, determine a target signal processing profile corresponding to the audio scene among one or more signal processing profile, and process the ambient sound according to the target signal processing profile.

20 Claims, 10 Drawing Sheets

(51) Int. Cl.
  *G10K 11/178* (2006.01)
  *G10L 25/51* (2013.01)
  *H04R 1/10* (2006.01)
(52) U.S. Cl.
  CPC ........ *G10K 11/17873* (2018.01); *G10L 25/51* (2013.01); *H04R 1/1083* (2013.01); *G10K 2210/1081* (2013.01); *G10K 2210/3027* (2013.01); *G10K 2210/3033* (2013.01); *G10K 2210/3056* (2013.01); *H04R 2460/01* (2013.01)
(58) Field of Classification Search
  CPC . G10K 2210/3056; G06F 3/165; G10L 25/51; H04R 2460/01
  USPC .................................................. 381/71.6, 71.1
  See application file for complete search history.

(56) References Cited

U.S. PATENT DOCUMENTS

| | | | |
|---|---|---|---|
| 10,728,688 | B2 | 7/2020 | Dickins et al. |
| 10,848,889 | B2 | 11/2020 | Sheaffer et al. |
| 2014/0270254 | A1 | 9/2014 | Oishi et al. |
| 2017/0194020 | A1 | 7/2017 | Miller et al. |
| 2017/0359659 | A1 | 12/2017 | Von Brasch et al. |
| 2020/0380945 | A1* | 12/2020 | Woodruff ............. G10K 11/178 |
| 2020/0382859 | A1 | 12/2020 | Woodruff et al. |

FOREIGN PATENT DOCUMENTS

| | | |
|---|---|---|
| KR | 10-2015-0102337 A | 9/2015 |
| KR | 10-2245065 B1 | 8/2016 |
| KR | 10-2017-0019750 A | 2/2017 |
| KR | 10-2019-0140457 A | 12/2019 |
| KR | 10-2020-0063290 A | 6/2020 |

OTHER PUBLICATIONS

Kuo et al., "Active Noise Control: A Tutorial Review," Jun. 6, 1999.
European Search Report dated Dec. 11, 2024, issued in European Application No. 22881256.6.

* cited by examiner

710

| Audio scene ID 720 | Profile number 730 | Pre-processing 740 | ANC profile 750 | | Ambient sound pass through profile 760 | | Transition time 770 |
|---|---|---|---|---|---|---|---|
| | | | RES 751 | Gain 756 | EQ 761 | Gain 766 | |
| Transportation | 1 | BF omni | Low-pass emphasis | Max | Off | 0 | Slow |
| Safety alarm | 2 | Alarm-direction BF | Out-of-alarm band | Low | Alarm band | Max | Fast |
| Talking to me | 3 | Voice-direction BF | Out-of-voice band | Low | Voice band | High | Fast |

780

| Number of times audio scene is determined | Number of times profile 1 is selected | Reliability of user's selection of profile 1 with respect to audio scene Transportation |
|---|---|---|
| C_s1 | C_p1 | C_s1>THD1, Cp2>THD2 → High reliability. |

FIG. 7

ELECTRONIC DEVICE FOR CONTROLLING AMBIENT SOUND BASED ON AUDIO SCENE AND OPERATING METHOD THEREOF

CROSS-REFERENCE TO RELATED APPLICATION(S)

This application is a continuation application, claiming priority under § 365(c), of an International Application No. PCT/KR2022/014499, filed on Sep. 27, 2022, which is based on and claims the benefit of a Korean patent application number 10-2021-0135951, filed on Oct. 13, 2021, in the Korean Intellectual Property Office, and of a Korean patent application number 10-2021-0180516, filed on Dec. 16, 2021, in the Korean Intellectual Property Office, the disclosure of each of which is incorporated by reference herein in its entirety.

BACKGROUND

1. Field

The disclosure relates to an electronic device for controlling an ambient sound based on an audio scene. More particularly, the disclosure relates to an electronic device and a method of controlling the electronic device for determining an audio scene according to an ambient sound, determining a corresponding target signal processing profile according to the audio scene, and processing the ambient sound according to the target signal processing profile.

2. Description of Related Art

The electronic device may provide a function related to audio signal processing. For example, the electronic device may provide a user function such as, a call function for collecting and transmitting an audio signal and a recording function for recording an audio signal. When the environment around the electronic device is noisy while the call function is being used, it may be difficult to obtain a good audio signal. When there is a lot of ambient noise while the electronic device is recording a voice signal, the noise and the voice signal are recorded together, such that it may be difficult to distinguish the voice signal.

An audio output device, such as a headphone, may be equipped with various noise canceling technologies. For example, the headphone may acquire ambient noise through a microphone connected to a noise canceling circuit, and may output an anti-noise signal having an antiphase relative to the acquired noise. The ambient noise and the antiphase noise may be heard together, which for the user may have the effect of removing the noise.

When an audio output device utilizes active noise cancellation (ANC) technology, it may be possible to acquire noise from an ANC microphone and to actively remove noise by determining a surrounding noise environment. The audio output device may be designed to cancel ambient noise from an output unit (speaker) so that an audio signal provided from a playback device may be more clearly provided to the user.

The above information is presented as background information only to assist with an understanding of the disclosure. No determination has been made, and no assertion is made, as to whether any of the above might be applicable as prior art with regard to the disclosure.

SUMMARY

In an earphone or headphone product, an active noise cancellation (ANC) function for attenuating ambient sound and an ambient sound enhancement (ASE) function for amplifying ambient sound may be provided based on a user operation.

Each user may prefer the ANC function or the ASE function depending on the surrounding environment. For example, even in the same environment, some people may prefer the ANC function, which cancels out ambient sounds, while others may prefer the ASE function, which amplifies ambient sounds.

Accordingly, a demand for a customized audio processing function for each user according to the surrounding environment is increasing.

According to an example embodiment, an electronic device is provided. The electronic device includes an input/output module configured to receive an ambient sound and output a sound in which the ambient sound is processed, an audio module configured to process the ambient sound, a memory configured to store computer-executable instructions and one or more signal processing profile, and a processor configured to execute the instructions by accessing the memory, wherein the instructions may be configured to determine an audio scene based on the ambient sound, determine a target signal processing profile corresponding to the audio scene, and process the ambient sound according to the target signal processing profile.

According to an example embodiment, an operating method of an electronic device is provided. The operating method includes receiving an ambient sound, determining an audio scene based on the ambient sound, determining a target signal processing profile corresponding to the audio scene among one or more signal processing profile, and processing the ambient sound according to the target signal processing profile.

According to an example embodiment, an operating method of an electronic device is provided. The operating method includes receiving an ambient sound, determining an audio scene based on the ambient sound, determining a target signal processing profile corresponding to the audio scene referring to user selection history information among one or more signal processing profile, and processing the ambient sound according to the target signal processing profile.

Various example embodiments may provide an electronic device that determines an audio scene according to an ambient sound and determines a corresponding signal processing profile to process the ambient sound, without user manipulation.

Various example embodiments may provide an electronic device that tailors ambient sound processing according to an audio scene based on a user selection history for a signal processing profile.

Various example embodiments may provide an electronic device that seamlessly switches a signal processing profile as an ambient sound changes.

Other example embodiments, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a signal processing profile and a user selection history according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Electronic Device

Figure 1:
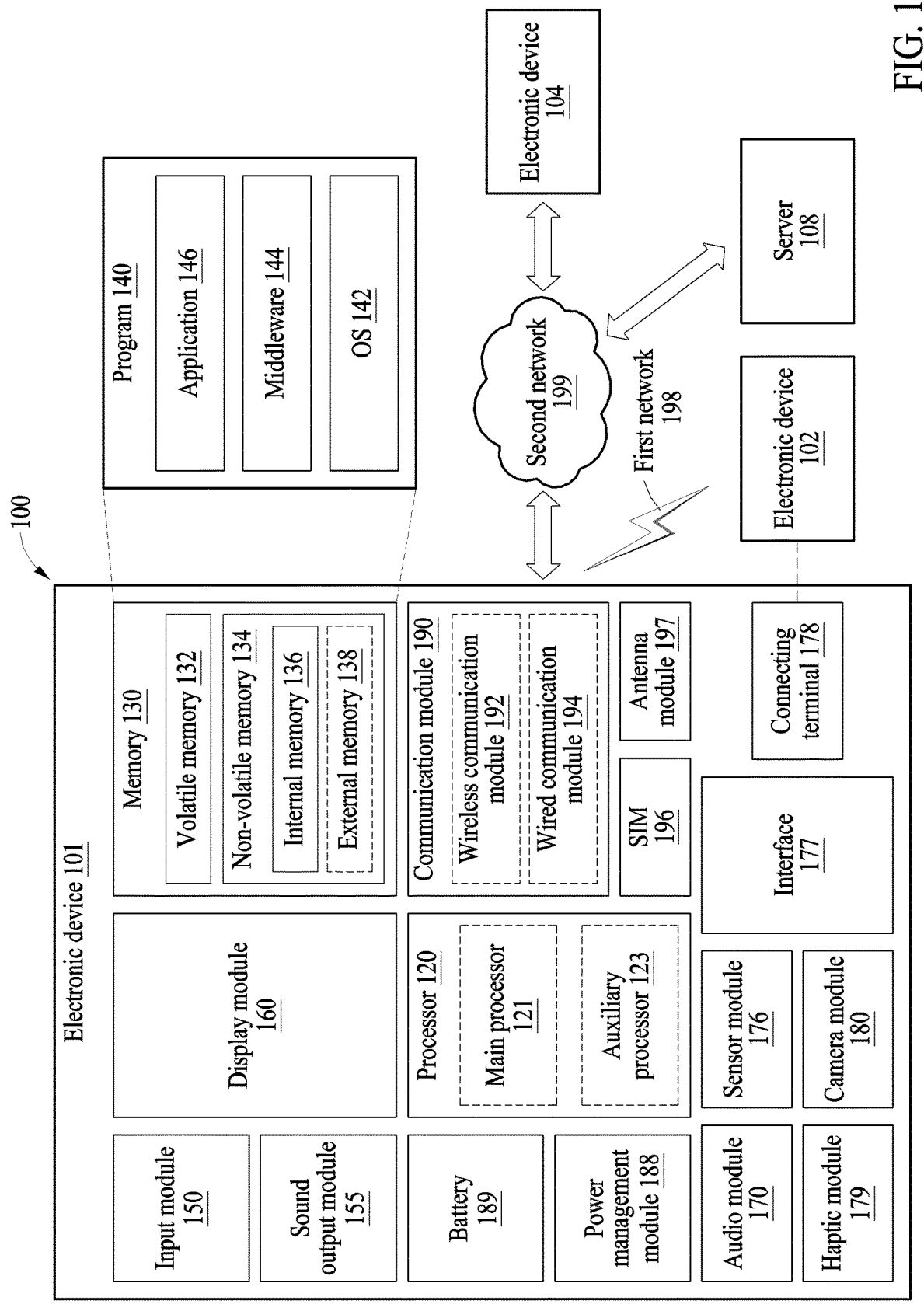
FIG. 1 is a block diagram illustrating an electronic device in a network environment according to an embodiment of the disclosure.

FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence (AI) model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure the intensity of force applied by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be the same in type as electronic device 101 or different in type than electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may transmit a request to one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, for example, distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
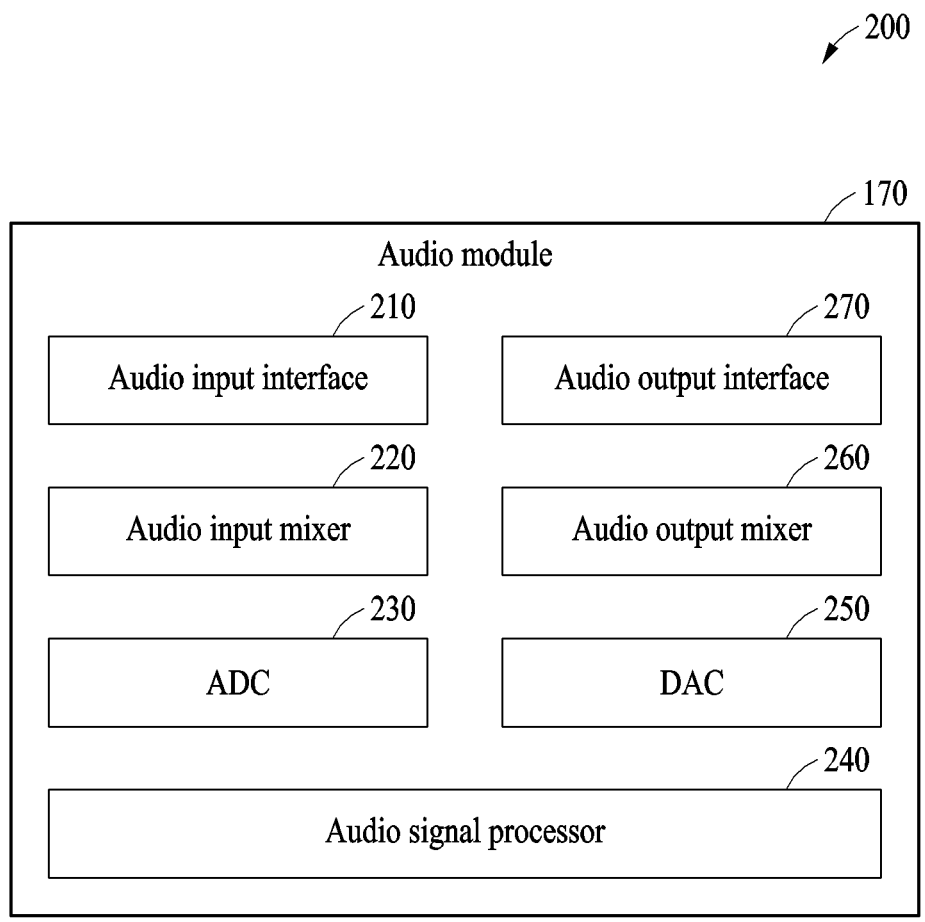
FIG. 2 is a block diagram illustrating an audio module according to an embodiment of the disclosure.

FIG. 2 is a block diagram 200 of an audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from outside the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an example embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an example embodiment, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to an example embodiment, the audio input mixer 220 may synthesize a plurality of analog audio signals input via the audio input interface 210 into at least one analog audio signal.

The ADC 230 may convert an analog audio signal into a digital audio signal. For example, according to an example embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an example embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an example embodiment, one or more functions of the audio signal processor 240 may be implemented in the form of an equalizer.

The DAC 250 may convert a digital audio signal into an analog audio signal. For example, according to an example embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to an example embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an example embodiment, the sound output module 155 may include a plurality of speakers. In such a case, the audio output interface 270 may output audio signals having a plurality of different channels (e.g., stereo channels or 5.1 channels) via at least some of the plurality of speakers. According to an example embodiment, the audio output interface 270 may be connected with the external electronic device 102 (e.g., an external speaker or a headset) directly via the connecting terminal 178 or wirelessly via the wireless communication module 192 to output an audio signal.

According to an example embodiment, the audio module 170 may generate, without separately including the audio input mixer 220 or the audio output mixer 260, at least one digital audio signal by synthesizing a plurality of digital audio signals using at least one function of the audio signal processor 240.

According to an example embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an example embodiment, the audio amplifier may be configured as a module separate from the audio module 170.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. The electronic device according to an example embodiment is not limited to those described above.

It should be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one or two of A, B, or C," each of which may include any one of the items listed together in the corresponding one of the phrases, or all possible combinations thereof Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same manner or in a similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
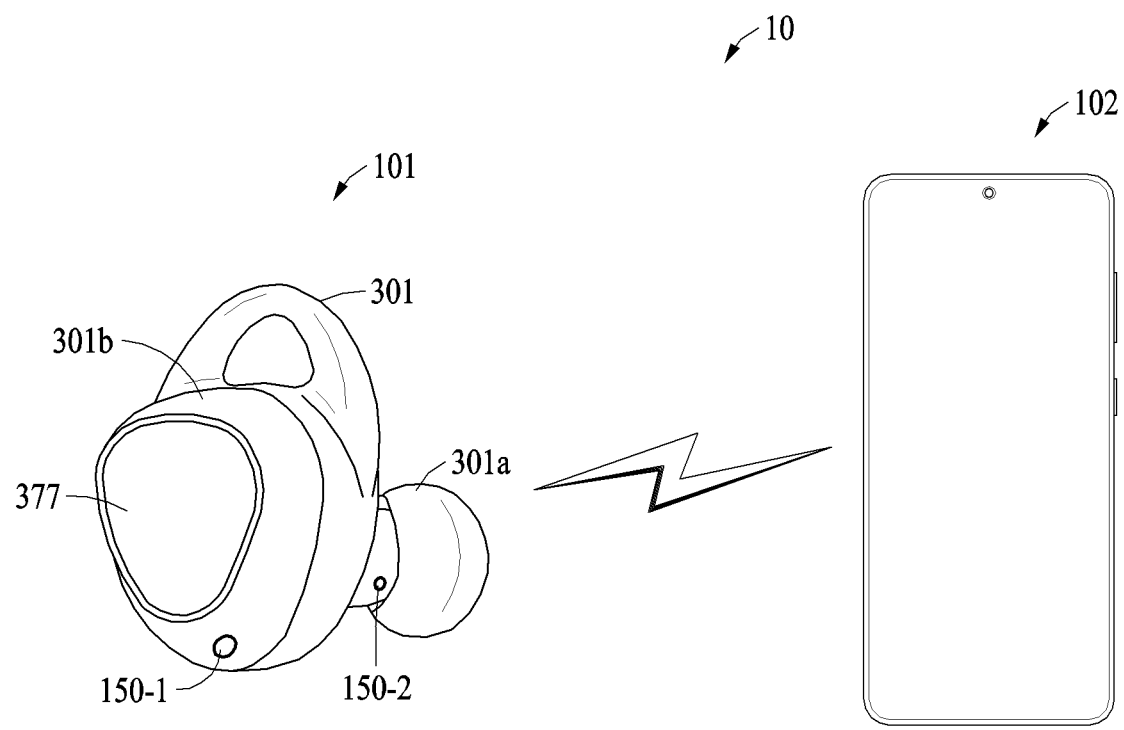
FIG. 3 is a diagram illustrating an example audio signal processing system according to an embodiment of the disclosure.

FIG. 3 is a diagram illustrating an example audio signal processing system 10 according to an embodiment of the disclosure.

Referring to FIG. 3, according to an example embodiment, the audio signal processing system 10 may include a first electronic device 101 and a second electronic device 102. The first electronic device 101 and the second electronic device 102 may include at least a part of the configuration of the electronic device 101 described above with reference to FIG. 1. According to an example embodiment, the first electronic device 101 may be connected to the second electronic device 102 by wire or wirelessly, and may output an audio signal transmitted by the second electronic device 102. The first electronic device 101 may collect an ambient sound by using at least one microphone and transmit the collected audio signal to the second electronic device 102.

According to an example embodiment, the first electronic device 101 may be a wireless earphone capable of forming a short-range communication channel (e.g., a Bluetooth module-based communication channel) with the second electronic device 102. For example, the first electronic device 101 may be any one of a true-wireless stereo (TWS), a wireless headphone, and a wireless headset. The first electronic device 101 is illustrated as a kernel-type wireless earphone in FIG. 3, but is not limited thereto. According to an example embodiment, the first electronic device 101 may be a wired earphone connected to the second electronic device 102 in a wired manner According to an example embodiment, the first electronic device 101, which is an earphone-type device, may include a housing 301 (or a case) including an insertion portion 301a that may be inserted into a user's ear, and a mounting portion 301b connected to the insertion portion 301a and capable of being mounted at least partially on the user's auricle. The first electronic device 101 may include at least one of microphones 150-1 and 150-2.

According to various example embodiments, the electronic device 101 may include an input interface 377 capable of receiving an input of the user. The input interface 377 may include, for example, a physical interface (e.g., a physical button or a touch button) and a virtual interface (e.g., a gesture, object recognition, or voice recognition). According to an example embodiment, the electronic device 101 may include a touch sensor (not shown) capable of detecting a contact with the user's skin. For example, an area (e.g., the input interface 377) in which the touch sensor is disposed may be located in a portion of the electronic device 101. The user may apply an input by touching a corresponding area using a body part. The touch input may include, for example, a single touch, multiple touches, a swipe, and/or a flick.

The microphones 150-1 and 150-2 may perform the function of the input module 150 described above with reference to FIG. 1, and any repeated description related thereto has been omitted. Among the microphones 150-1 and 150-2, first microphone 150-1 may be disposed on the mounting portion 301b such that, based on the inside of the ear, at least a portion of the sound hole may be exposed to the outside, to collect external ambient sound while the first electronic device 101 is worn on the user's ear. Among the microphones 150-1 and 150-2, second microphone 150-2 may be disposed on the insertion portion 301a. The second microphone 150-2 may be disposed such that, based on the auricle-side opening of the outer ear path, at least a portion of the sound hole is exposed toward the inside of the outer ear path or at least a portion of the sound hole is in contact with the inner wall of the outer ear path, to collect signals transmitted into the outer ear canal (or, external auditory canal) while the first electronic device 101 is worn on the user's ear. For example, when the user makes a voice utterance while wearing the first electronic device 101, at least some of the tremor from the utterance may be transmitted through the user's skin, muscles, or bones, and the transmitted tremor may be collected as ambient sound by the second microphone 150-2 inside the ear. According to various example embodiments, the second microphone 150-2 may be any of various types of microphones (e.g., an in-ear microphone, an inner microphone, or a bone conduction microphone) capable of collecting sound from the cavity inside the user's ear. For example, the second microphone 150-2 may include at least one air conduction microphone and/or at least one bone conduction microphone for detecting a voice. The air conduction microphone may detect a voice (e.g., an utterance of a user) transmitted through air and output a voice signal corresponding to the detected voice. The bone conduction microphone may measure a vibration of a bone (e.g., the skull) caused by a vocalization of a user and output a voice signal corresponding to the measured vibration. The bone conduction microphone may be referred to as a bone conduction sensor, or various other names A voice detected by the air conduction microphone may be a voice mixed with external noise, the mixing occurring while the user's utterance is being transmitted through air. Since the voice detected by the bone conduction microphone is from the vibration of a bone, it may include less external noise (e.g., influence of noise).

According to an example embodiment, the first electronic device 101 may include the audio module 170 described above with reference to FIGS. 1 and 2. Any repeated description related thereto has been omitted. The first electronic device 101 may perform audio signal processing such as noise processing (e.g., noise suppressing), frequency band adjustment, and gain adjustment through the audio module 170 (e.g., through the audio signal processor 240 of FIG. 2). The configuration of the first electronic device 101 will be described in detail with reference to FIG. 4. The first electronic device 101 may be referred to as the electronic device 101 in the descriptions relating to FIGS. 4 to 10.

According to an example embodiment, the electronic device 101 may include a sensor capable of detecting if the electronic device 101 is worn on the user's ear. For example, the sensor may include a sensor (e.g., an infrared sensor or a laser sensor) capable of detecting a distance to an object, and a sensor (e.g., a touch sensor) capable of detecting a contact with the object. As the electronic device 101 is worn on the user's ear, the sensor may generate a signal by detecting a distance to the skin or a contact with the skin. The processor 120 of the electronic device 101 may recognize whether the electronic device 101 is currently worn by detecting the signal generated by the sensor.

According to an example embodiment, the second electronic device 102 may establish a communication channel with the first electronic device 101, transmit a designated audio signal to the first electronic device 101, or receive an audio signal from the first electronic device 101. For example, the second electronic device 102 may be any of various electronic devices such as a mobile terminal, a terminal device, a smartphone, a tablet personal computer (PC), a pad, or a wearable electronic device capable of forming a communication channel (e.g., a wired or wireless communication channel) with the first electronic device 101. The second electronic device 102 may include a configuration that is the same as or similar to the configuration of the electronic device 101 described above with reference to FIG. 1, and may include fewer or more configurations than the electronic device 101 of FIG. 1 depending on the implementation. The second electronic device 102 may be referred to as the electronic device 102 in the descriptions relating to FIGS. 4 to 10.

According to an example embodiment, in the audio signal processing system 10, the first electronic device 101 may provide an active noise cancellation (ANC) function. For example, based on an audio signal collected by the at least one of microphones 150-1 and 150-2, the first electronic device 101 may generate an audio signal having relatively less noise signals or an audio signal in which relatively at least a part of a signal in a particular (or, predetermined) frequency band (e.g., a band outside a voice signal) has been removed.

ANC is a technology that uses the principle of superposition of waves, and that actively reduces acoustic noise in the air by generating a waveform that is an inverse of the waveform of the noise. The ANC function may be implemented in the electronic device 101 in various ways. For example, the electronic device 101 may capture an external noise reference signal through one or more microphone 150-1, and generate and reproduce a signal with a 180° phase-shifted waveform from the noise reference signal, to reduce noise through destructive interference. Through the ANC function, high-quality sound from which noise has been removed may be provided to the user. An ANC circuit according to an example embodiment will be described in detail with reference to FIG. 5.

According to an example embodiment, in the audio signal processing system 10, the first electronic device 101 may provide an ambient sound enhancement (ASE) function. ASE is a technology for amplifying ambient sound, and when the ASE function is used in the first electronic device 101, the user may listen to both the sound output from the first electronic device 101 and the ambient sound. A function of passing through or amplifying ambient sound as it is may be referred to as an ambient sound pass through function, in addition to an ASE function.

The ASE function may be implemented in the electronic device 101 in various ways. For example, based on an audio signal collected by the microphones 150-1 and 150-2, the first electronic device 101 may generate an audio signal in which at least a part of a particular (or, predetermined) frequency band (e.g., a voice signal band) is emphasized or in which a gain is adjusted. An ambient sound may be provided to a user through the ASE function. For example, when a user uses a kernel-type earphone as the first electronic device 101 in which it may be difficult to detect ambient danger sounds, use safety may be improved through the ASE function. An ASE circuit according to an example embodiment will be described in detail with reference to FIG. 6.

According to an example embodiment, the audio signal processing system 10 may control an ambient sound based on an audio scene. Referring to FIG. 3, the audio signal processing system 10 is illustrated as including the first electronic device 101 and the second electronic device 102, but is not limited thereto. The function of controlling the ambient sound based on the audio scene may be implemented in the first electronic device 101 or through a collaboration between the first electronic device 101 and the second electronic device 102.

According to an example embodiment, an audio scene may be a unit classified based on a plurality of sound sources. An audio scene may be classified according to a voice, music, or a sound effect. For example, in a sports broadcast, a sports broadcasting scene may consist of two main sound sources: a voice of a commentator and shouts from spectators. According to an example embodiment, an audio scene may be recognized and classified as a sports broadcasting scene based on an audio signal, for example, a voice of a commentator and shouts from spectators.

According to an example embodiment, in the audio signal processing system 10, an audio signal processing method and function may be independently implemented in the first electronic device 101 without intervention of the second electronic device 102. When the function of controlling the ambient sound based on the audio scene is implemented as stand-alone for the first electronic device 101, the function of controlling the ambient sound based on the audio scene may be provided in the first electronic device 101 without communication with the second electronic device 102. For example, the first electronic device 101 may receive an ambient sound, determine an audio scene based on the ambient sound, determine a target signal processing profile corresponding to the audio scene, and determine the ambient sound according to the target signal processing profile.

According to an example embodiment, the audio signal processing method and function may be implemented through operations of the first electronic device 101 and the second electronic device 102. For example, in order to control an ambient sound based on an audio scene, the first electronic device 101 may receive an ambient sound and transmit the received ambient sound to the second electronic device 102 so that the audio scene may be determined based on the ambient sound by the second electronic device 102. The second electronic device 102 may transmit the determined audio scene information to the first electronic device 101, and the first electronic device 101 may determine a target signal processing profile corresponding to the audio scene and process the ambient sound according to the target signal processing profile.

Figure 4:
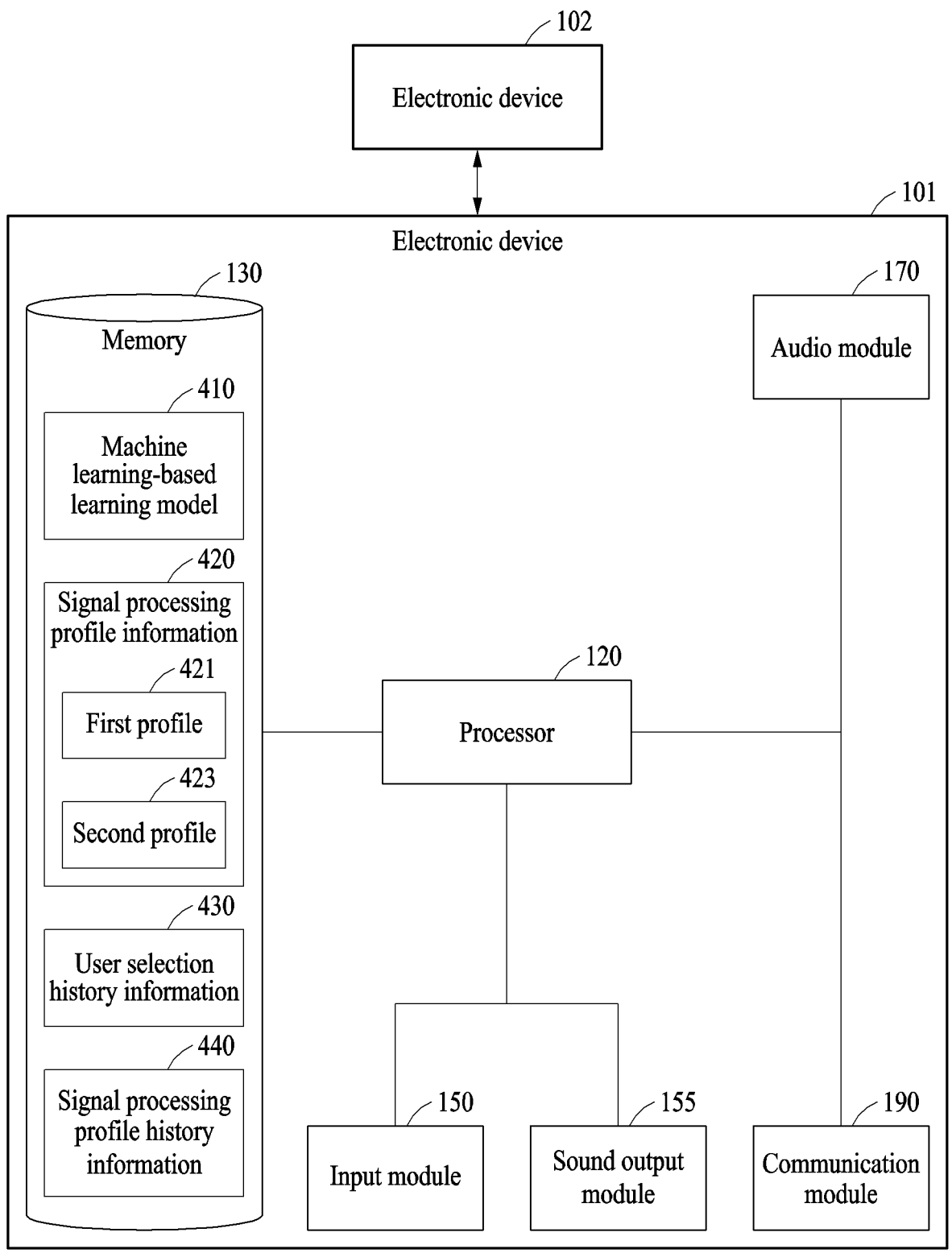
FIG. 4 is a block diagram illustrating a configuration of an electronic device according to an embodiment of the disclosure.

FIG. 4 is a block diagram illustrating a configuration of an electronic device 101 according to an embodiment of the disclosure. The electronic device 101 of FIG. 4 may be the first electronic device 101 described above with reference to FIG. 3, and an electronic device 102 of FIG. 4 may be the second electronic device 102 described above with reference to FIG. 3.

Referring to FIG. 4, the electronic device 101 may include an input module 150 for receiving an ambient sound, a sound output module 155 for outputting a sound in which the ambient sound is processed, an audio module 170 for processing the ambient sound, a memory 130 in which computer-executable instructions and signal processing profile information 420 are stored, and a processor 120 that accesses the memory 130 to execute the instructions.

The processor 120 may determine an audio scene based on the ambient sound received through the input module 150. For example, the processor 120 may determine the audio scene according to at least one of a location and a feature of the ambient sound, based on a pre-trained learning model. Referring to FIG. 4, the electronic device 101 may include a machine learning-based learning model (i.e., a learning model) 410 for determining an audio scene, and the processor 120 may determine an audio scene through the learning model 410.

According to an example embodiment, the machine learning-based learning model 410 may include a large amount of training data, and may be difficult to implement in an earphone-type electronic device 101. As described above with reference to FIG. 3, the function of controlling an ambient sound based on an audio scene may be implemented through a collaboration with the electronic device 102. For example, the learning model 410 for determining an audio scene may be implemented to be included in the electronic device 102. The processor 120 of the electronic device 101 may transmit the ambient sound received through the input module 150 to the electronic device 102, and the audio scene may be determined through the learning model 410 in the electronic device 102, and information on the audio scene may be transmitted to the electronic device 101.

According to an example embodiment, there may be an ID for an audio scene, and the audio scene may be classified according to a hierarchy. For example, if the audio scene is classified according to location, an ID for the audio scene may include a quiet state, indoor, outdoor, or traffic conditions, and an ID for an indoor audio scene may include one or more sub-IDs such as office, cafe, subway station, gym, or airport. The processor 120 may determine the audio scene based on an audio signal and determine a corresponding signal processing profile based on an ID for the audio scene. For example, the learning model 410 may be configured such that a location is determined according to a plurality of sound sources. The processor 120 may receive a plurality of sound sources, for example, a voice of a commentator and shouts from spectators, as an audio signal in a sports broadcast, and determine that the audio scene is outdoor, particularly a sports stadium, based on the learning model 410. The processor 120 may determine a corresponding signal processing profile (e.g., an ANC profile) based on a sub-ID corresponding to a sports stadium among the IDs corresponding to an outdoor audio scene.

According to an example embodiment, the memory 130 may include signal processing profile information 420 including one or more signal processing profiles (e.g., a first signal processing profile 421 and a second signal processing profile 423), and the processor 120 may determine the target signal processing profile corresponding to the audio scene referring to the signal processing profile information 420. Each of the one or more signal processing profile 421 and 423 included in the signal processing profile information 420 may be configured as a combination of a profile for the setting of an ANC circuit for attenuating ambient sound and a profile for the setting of an ASE circuit for passing through the ambient sound. It is illustrated in FIG. 4 that the signal processing profile information 420 only includes the first signal processing profile 421 and the second signal processing profile 423, but the signal processing profile information 420 is not limited thereto, and the signal processing profile information 420 may include several profiles according to user settings.

According to an example embodiment, the processor 120 may determine a target signal processing profile among one or more signal processing profile based on a user selection, and store information of a signal processing profile selected by the user for the audio scene to the user selection history information 430 in association with the audio scene information. When user selection data is accumulated such that a reliability of the user's selection of a predetermined signal processing profile for a predetermined audio scene is greater than or equal to a threshold value, the processor 120 may determine the corresponding signal processing profile without user selection by referring to the user selection history information 430.

According to an example embodiment, the processor 120 may process an ambient sound according to the target signal processing profile. The processor 120 may adjust at least one of a frequency band of the ambient sound and a gain, according to at least one of a sound source type of the ambient sound and a sound source direction of the ambient sound, based on the target signal processing profile. For example, the processor 120 may determine an audio scene as "talking to me" by determining that it is a situation in which a voice is received from a predetermined direction toward the electronic device 101 based on the ambient sound, perform pre-processing of beamforming in the voice direction according to the corresponding target signal processing profile, and remove a frequency band outside the voice based on the ANC profile, and adjust a gain to a low level. At the same time, with respect to a frequency band of the voice, the band may be emphasized based on the ASE profile, and the gain may be adjusted to a high level.

Various example embodiments of determining a signal processing profile referring to the user selection history information 430 and various example embodiments of processing an ambient sound based on the signal processing profile will be described in detail with reference to FIG. 7.

According to an example embodiment, the processor 120 may seamlessly switch a profile such that the user does not recognize the profile is being switched. The processor 120 may implement a seamless transition between profiles by using a recursive averaging technique. For example, when the processor 120 switches the target signal processing profile from the first signal processing profile 421 to the second signal processing profile 423, the recursive averaging technique may be applied to a gain (G) value for the gain of the first signal processing profile 421 and an EQ value for the bandwidth of the first signal processing profile 421, and the G value may be determined by Equation 1 expressed below, and the EQ value may be determined by Equation 2 expressed below.

$$G(t)=B_1 \times G(-1)+(1-B_1) \times G\_target, \ (0 \leq B_1 \leq 1) \quad \text{Equation 1}$$

$$EQ(t)=B \times EQ(-1)+(1-B_2) \times EQ\_target, \ (0 \leq B_2 \leq 1) \quad \text{Equation 2}$$

When the processor 120 switches the target signal processing profile from the first signal processing profile 421 to the second signal processing profile 423 according to a change in the ambient sound, G(0) and EQ(0) may be the G value and the EQ value of the first signal processing profile 421, and G_target or EQ_target may be the G value and the EQ value of the second signal processing profile 423. $B_1$ and $B_2$ may be a value between 0 and 1, $B_1$ may correspond to a speed in gain conversion, and $B_2$ may correspond to a speed in EQ conversion. For example, when $B_1$ and $B_2$ are close to 1, the conversion speed becomes slower, and the user may experience a more seamless transition. When $B_1$ and $B_2$ are close to 0, the user may experience a fast transition. $B_1$ and $B_2$ may be changed according to a user setting, and $B_1$ and $B_2$ values may be determined for each profile.

According to an example embodiment, in order for the processor 120 to provide a seamless transition using the recursive averaging technique, an applied profile history (e.g., G(t−1) in Equation 1, EQ(t−1) in Equation 2) may be needed. In the profile transition process, the processor 120 may store the signal processing profile history in the signal processing profile history information 440, and provide a seamless transition by referring to the signal processing profile history information 440.

Figure 5:
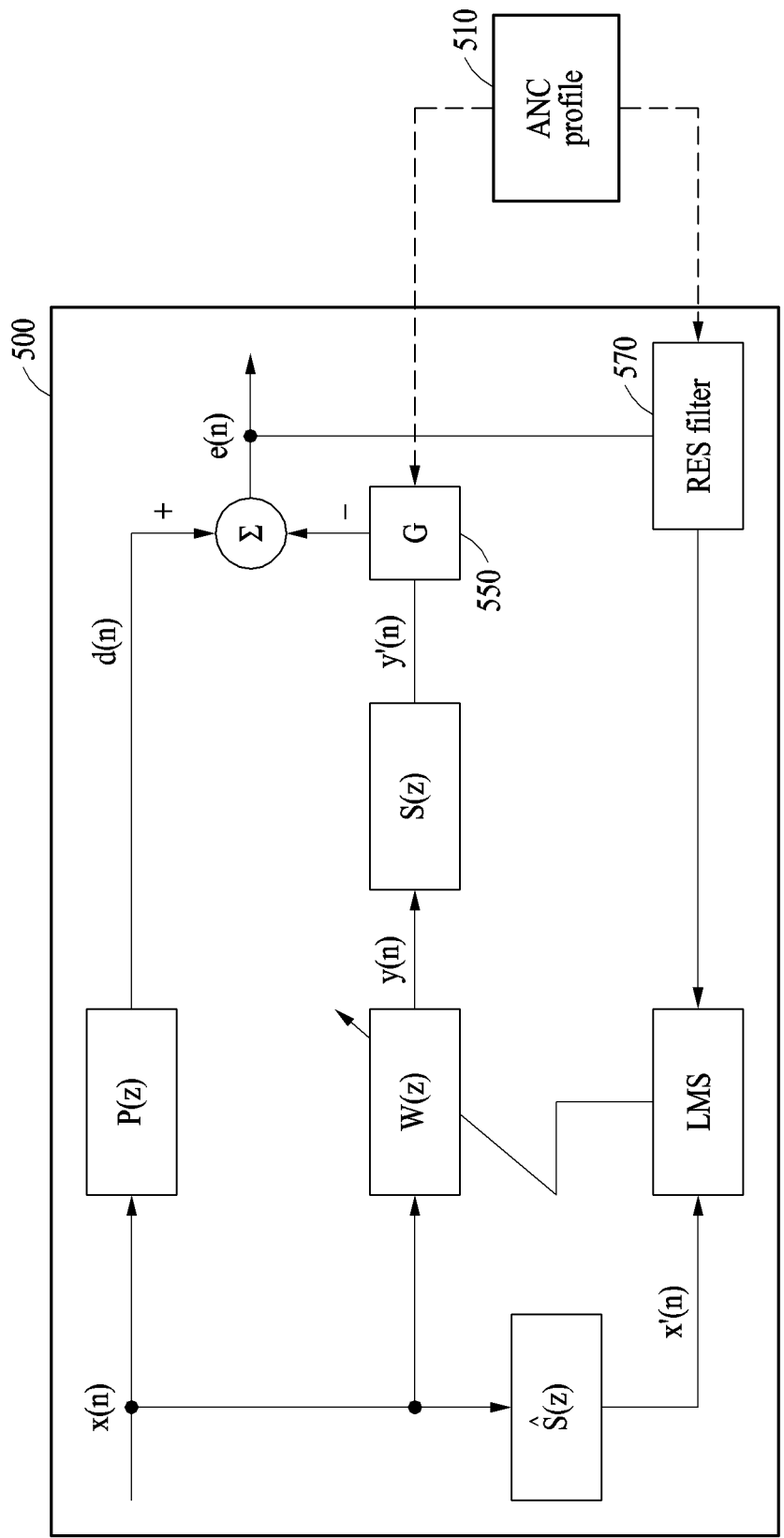
FIGS. 5 and 6 are diagrams illustrating an ANC circuit and an ASE circuit according to various embodiments of the disclosure.
Figure 6:
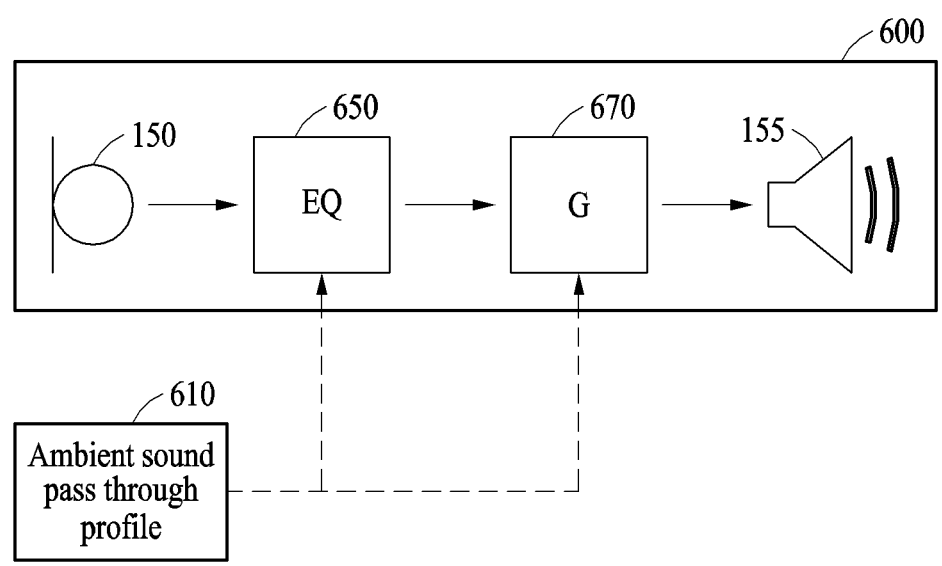

FIGS. 5 and 6 are diagrams illustrating an ANC circuit and an ASE circuit according to various embodiments of the disclosure.

FIG. 5 is a diagram illustrating an operation in which ambient sound is attenuated based on an ANC profile 510 according to an embodiment of the disclosure. A circuit 500 of FIG. 5 may be an ANC circuit for attenuating ambient sound based on filtered-x least mean squared (LMS) (FxLMS) algorithm according to an example embodiment.

According to an example embodiment, the processor 120 may calculate a phase difference with respect to an ambient sound to be attenuated using an adaptive algorithm, and may generate a noise reduction signal having an antiphase opposite to a phase of the ambient sound. The circuit 500 of FIG. 5 is illustrated as using an FxLMS algorithm as an adaptive algorithm, but is not limited thereto. Since the FxLMS algorithm is generally used in the ANC field, a detailed description thereof has been omitted.

According to an example embodiment, the processor 120 may adjust a frequency band and a gain based on the ANC profile 510. The frequency band may be adjusted through the control of a residual error shaping (RES) filter 570 of the circuit 500, and the gain may be adjusted through the control of a gain 550 of the circuit 500. An ambient sound processing operation based on the ANC profile 510 will be described in detail with reference to FIG. 7.

FIG. 6 is a diagram illustrating an operation in which ambient sound is amplified based on an ambient sound pass through profile or an ASE profile 610 according to an embodiment of the disclosure. A circuit 600 of FIG. 6 may be an ASE circuit for amplifying ambient sound according to an example embodiment.

According to an example embodiment, the processor 120 may adjust a frequency band and a gain based on an ambient sound pass through profile 610. Referring to the circuit 600, the frequency band of an ambient sound received by the input module 150, for example, a microphone, may be adjusted through the control of an equalizer (EQ) filter 650 of the circuit 600, and the gain may be adjusted through the control of a gain 670 of the circuit 600. An ambient sound processed based on the ambient sound pass through profile 610 may be output through the sound output module 155, for example, a speaker. An ambient sound processing operation based on the ambient sound pass through profile 610 will be described in detail with reference to FIG. 7.

FIG. 7 is a diagram illustrating a signal processing profile and a user selection history according to an embodiment of the disclosure.

Signal processing profile information 710 is described hereinafter with reference to FIG. 7. According to an example embodiment, the signal processing profile information 710 may be the signal processing profile information 420 stored in the memory 130 described above with reference to FIG. 4, and may include one or more of profiles 721, 722, and 723. Each of the profiles 721, 722, and 723 may be configured as a combination of an ANC profile 750 and an ambient sound pass through profile 760.

According to an example embodiment, the signal processing profile information 710 may include information on a profile number 730 corresponding to an audio scene ID 720 and a method of preprocessing 740 corresponding to the profile number 730, setting information of the ANC profile 750, setting information of the ambient sound pass through profile 760, and information on a transition time 770.

As described above with reference to FIG. 4, the audio scene ID 720 may be determined according to at least one of a location and a feature of an ambient sound, based on a pre-trained learning model. The processor 120 may determine the audio scene ID 720 for the ambient sound referring to the learning model 410 for determining the audio scene.

Each profile number 730 may be determined based on the audio scene ID 720, and the method of preprocessing 740 may be determined according to the audio scene ID 720. As described above with reference to FIG. 4, the processor 120 may preprocess 740 an ambient sound differently according to at least one of a sound source type and a sound source direction of the ambient sound.

The ANC profile 750 may be the ANC profile 510 described above with reference to FIG. 5, a setting of the RES filter 751 of the ANC profile 750 may be setting information of the RES filter 570 of the circuit 500 described above with reference to FIG. 5, and a gain 756 of the ANC profile 750 may be setting information of the gain 550 of the circuit 500 described above with reference to FIG. 5.

The ambient sound pass through profile 760 may be the ambient sound pass through profile 610 described above with reference to FIG. 6, a setting of the EQ filter 761 of the ambient sound pass through profile 760 may be setting information of the EQ filter 650 of the circuit 600 described above with reference to FIG. 6, and a gain 766 of the ambient sound pass through profile 760 may be setting information of the gain 670 of the circuit 600 described above with reference to FIG. 6.

Information on the transition time 770 may correspond to the $B_1$ value of Equation 1 and the $B_2$ value of Equation 2 related to the seamless transition described with reference to FIG. 4. For example, if the transition time of the profile 721 is set to slow, the processor 120 may set the $B_1$ value of Equation 1 and the $B_2$ value of Equation 2 close to 1 when switching from the profile 721 to another profile.

Hereinafter, the settings for each profile 721, 722, and 723 are described in detail with reference to the signal processing profile information 710 of FIG. 7. Profile 1 721 may include setting information for a case where the audio scene ID 720 is "Transportation." According to profile 1 721, the processor 120 may preprocess 740 an ambient sound with omni-directional beamforming (BF omni), set the RES filter 751 of the ANC profile 750 to low-pass emphasis to attenuate the ambient sound, set the gain 756 to maximum, turn off the EQ filter 761 of the ambient sound pass through profile 760, set the gain 766 to 0, and set the transition time 770 to slow.

Profile 2 722 may include setting information for a case where the audio scene ID 720 is "Safety alarm." According to profile 2 722, the processor 120 may preprocess 740 an ambient sound with alarm-direction beamforming, set the RES filter 751 of the ANC profile 750 to out-of-alarm band filtering to attenuate the ambient sound outside the alarm band, set the gain 756 to low, set the EQ filter 761 of the ambient sound pass through profile 760 to alarm band emphasis, set the gain 766 to maximum, and set the transition time 770 to fast.

Profile 3 723 may include setting information for a case where the audio scene ID 720 is "Talking to me." According to profile 3 723, the processor 120 may preprocess 740 an ambient sound with voice-direction beamforming, set the RES filter 751 of the ANC profile 750 to out-of-voice band filtering to attenuate the ambient sound outside the voice band, set the gain 756 to low, set the EQ filter 761 of the ambient sound pass through profile 760 to voice band emphasis, set the gain 766 to high, and set the transition time 770 to fast.

Profile 1 721, profile 2 722, and profile 3 723 have been described with reference to the signal processing profile information 710 of FIG. 7, but are not limited thereto, and the profiles may be set in various ways to correspond to the audio scene ID.

Table 780 of FIG. 7 explains the user selection history information 440 described above with reference to FIG. 4. Setting information for various profiles, such as the signal processing profile information 710, may be stored in the memory 130, and the processor 120 may set various profiles according to each audio scene, but a profile setting preference for an audio scene may be different for each user. For example, each user may have a different preferred profile for the same audio scene. The user selection history information 430 may be utilized to provide a customized profile for each user. An operation of the processor 120 providing a customized profile based on the user selection history information 430 according to various example embodiments will be described in detail with reference to FIGS. 9 and 10.

According to an example embodiment, table 780 may be information that shows a history of the user selecting profile 1 721 of the signal processing profile information 710, when the audio scene ID included in the user selection history information 430 is "Transportation." Even if the user has a history of selecting a particular profile (e.g., profile 1 721) for a particular audio scene (e.g., "Transportation" audio scene) once, processing the ambient sound according to the one-time history may not match the user's intention. The processor 120 may consider a reliability of the user's selection of a predetermined profile for a predetermined audio scene.

Referring to table 780, when the number of times the audio scene ID is determined to be "Transportation" is C_s1, and the audio scene ID is "Transportation," the number of times the user selects profile 1 721 is C_p1. When C_s1 is greater than or equal to a threshold value THD1 (e.g., 5 times), and at the same time, C_p1 equals a threshold value (THD2) (e.g., 3 times), the processor 120 may determine that the reliability of the user's selection of profile 1 721 with respect to the audio scene ID "Transportation" is high. Then, when the audio scene ID is determined to be "Transportation," the processor 120 may determine profile 1 721 as a target profile without requesting a user selection, and process the ambient sound based on profile 1 721.

However, the example embodiment is not limited thereto, and the reliability of the user selection may be determined in various ways.

Operating Method of Electronic Device

Figure 8:
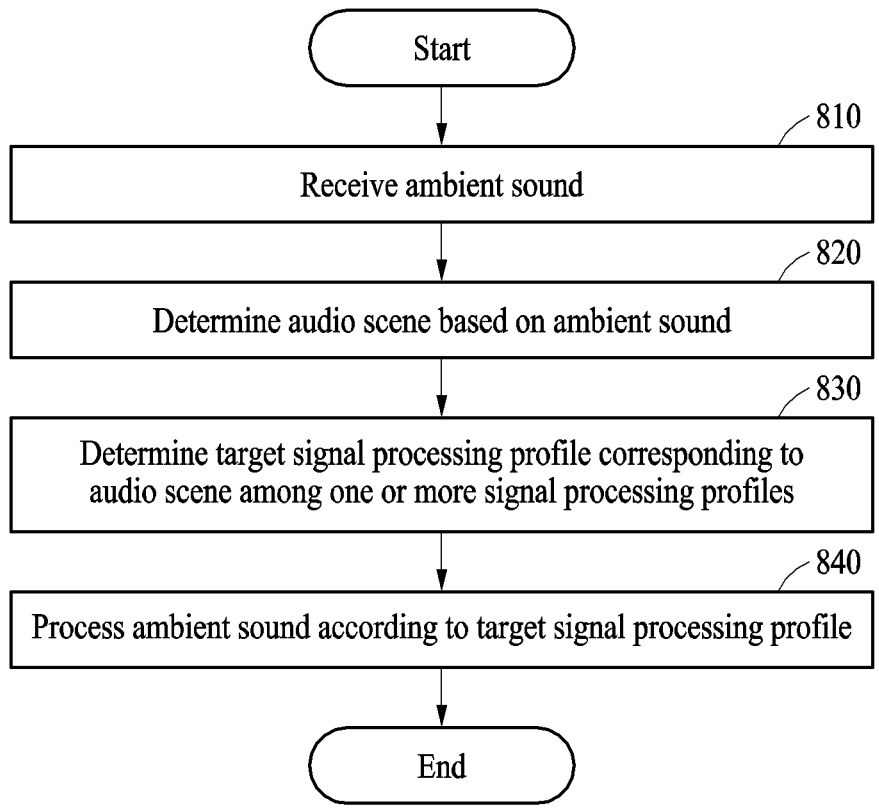
FIG. 8 is a flowchart illustrating an operating method of an electronic device according to an embodiment of the disclosure.

FIG. 8 is a flowchart illustrating an operating method of an electronic device 101 according to an embodiment of the disclosure.

Operations 810 to 840 may be performed by the processor 120 of the electronic device 101 described above with reference to FIG. 4. Thus, descriptions overlapping with the description referring to FIGS. 1 to 7 will not be repeated for conciseness.

According to an example embodiment, in operation 810, the processor 120 may receive an ambient sound. The ambient sound may be received through the input module 150, for example, the microphones 150-1 and 150-2 of FIG. 3, described above with reference to FIG. 4.

According to an example embodiment, in operation 820, the processor 120 may determine an audio scene based on the ambient sound. As described above with reference to FIGS. 4 and 7, the processor 120 may determine an audio scene according to at least one of a location and a feature of the ambient sound, based on the pre-trained learning model 410. As described above with reference to FIG. 4, the audio scene may be hierarchically classified by ID and sub-ID, and may be classified in various other ways according to example embodiments.

As described above with reference to FIG. 4, when the learning model for determining an audio scene is implemented in an external electronic device, for example, the electronic device 102 of FIG. 4, the processor 120 may transmit an ambient sound to the electronic device 102 and the audio scene may be determined in the electronic device 102.

According to an example embodiment, in operation 830, the processor 120 may determine a target signal processing profile corresponding to the audio scene among one or more signal processing profile. As described above with reference to FIG. 7, one or more of signal processing profiles 721, 722, and 723 included in the signal processing profile information 710 may be configured in various ways, and the processor 120 may determine a signal processing profile predetermined for an audio scene as the target signal processing profile referring to the signal processing profile information 710. However, the example embodiment is not limited thereto, and the processor 120 may determine the target signal processing profile based on a user input. Various example embodiments of determining the target signal processing profile will be described in detail with reference to FIGS. 9 and 10.

According to an example embodiment, in operation 840, the processor 120 may process the ambient sound according to the target signal processing profile. For example, as described above with reference to FIG. 7, the audio scene ID based on the ambient sound may be "Transportation" and the corresponding target signal processing profile may be profile 1 721. The processor 120 may, according to profile 1 721, preprocess 740 an ambient sound with omni-directional beamforming (BF omni), set the RES filter 751 of the ANC profile 750 to low-pass emphasis to attenuate the ambient sound, set the gain 756 to maximum, turn off the EQ filter 761 of the ambient sound pass through profile 760, set the gain 766 to 0, and set the transition time 770 to slow.

According to an example embodiment, the processor 120 may output the ambient sound processed according to the target signal processing profile through the sound output module 155, for example, the speaker of the electronic device 101 of FIG. 3. As described above with reference to FIG. 4, the processor 120 may provide a seamless transition when switching a profile through the recursive averaging technique referring to the profile history information 440.

Figure 9:
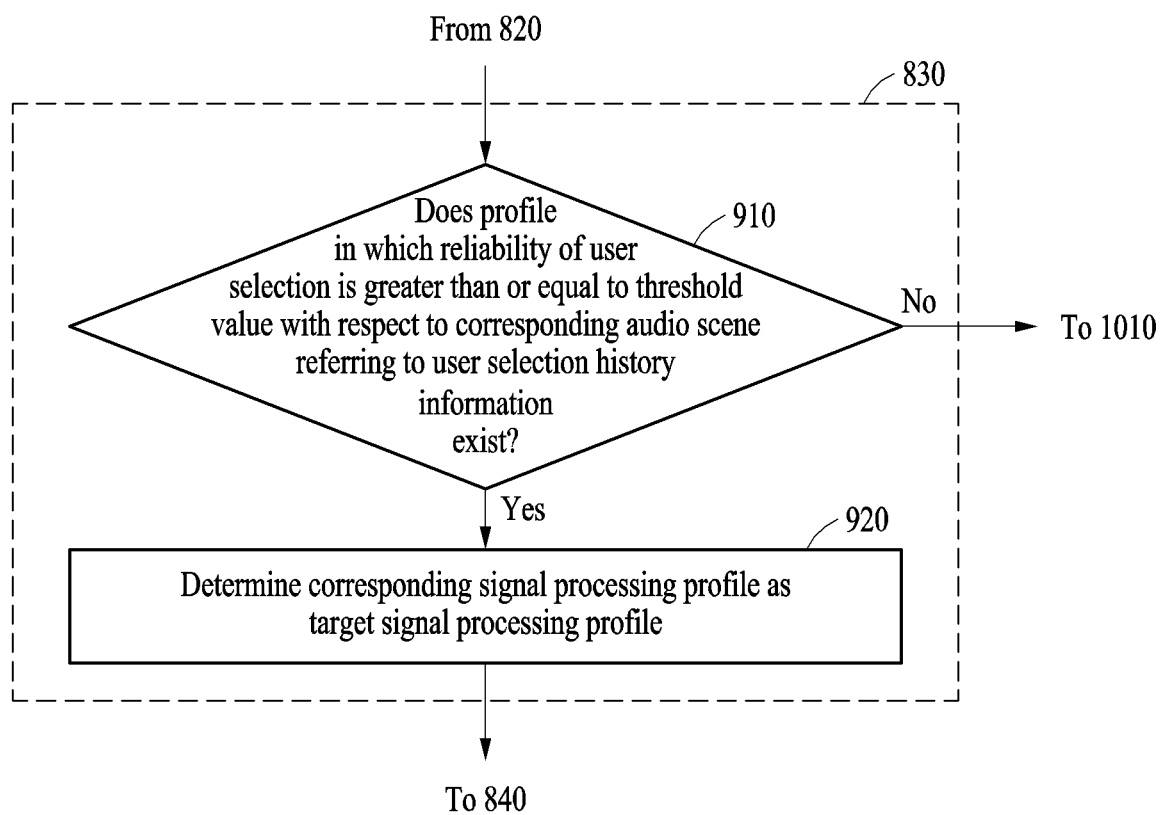
FIGS. 9 and 10 are flowcharts illustrating an operation of determining a signal processing profile based on a user selection history according to various embodiments of the disclosure.
Figure 10:
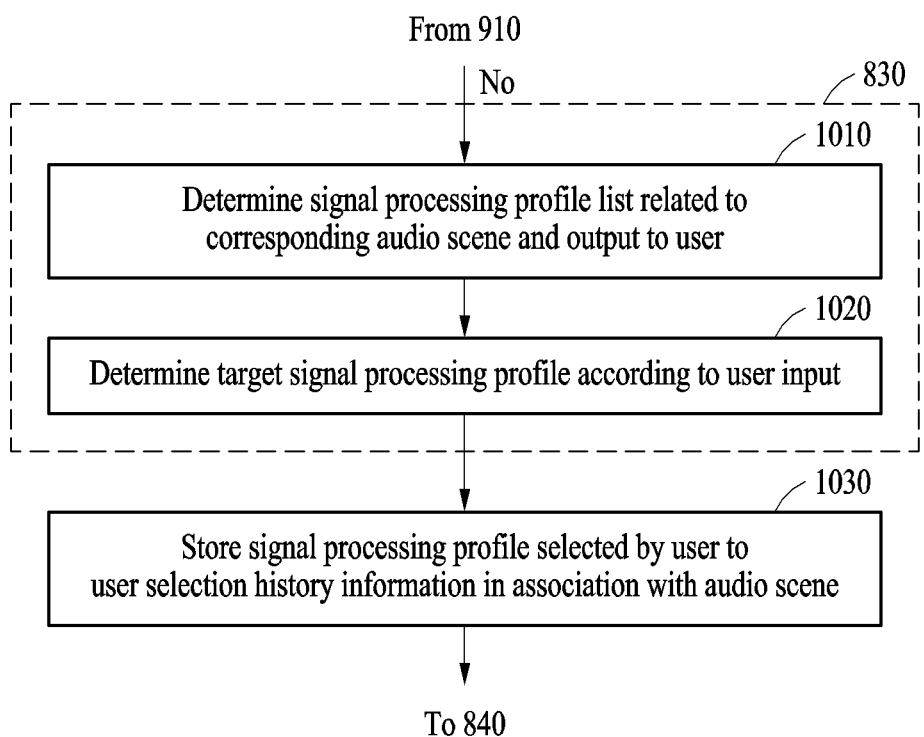

FIGS. 9 and 10 are flowcharts illustrating an operation of determining a signal processing profile based on a user selection history according to various embodiments of the disclosure.

Operations 910 and 920 and operations 1010 to 1030 may be performed by the processor 120 of the electronic device 101 described above with reference to FIG. 4. Thus, descriptions overlapping with the description provided with reference to FIGS. 1 to 8 will not be repeated for conciseness.

According to an example embodiment, operations 910 and 920 and operations 1010 and 1020 may correspond to an operation (e.g., operation 830 of FIG. 8) of determining a target signal processing profile corresponding to an audio scene described with reference to FIG. 8.

Referring to FIG. 9, in operation 910, the processor 120 may determine whether a profile in which a reliability of a user selection is greater than or equal to a threshold value exists with respect to the audio scene determined in operation 820, referring to the user selection history information 430. For example, as described above with reference to table 780 of FIG. 7, the processor 120 may calculate the reliability of the user's selection of a predetermined profile for a predetermined audio scene.

According to an example embodiment, in operation 920, the processor 120 may determine a profile having a reliability greater than or equal to a threshold value as the target signal processing profile. Hereinafter, an example embodiment in which there is no profile having a reliability greater than or equal to the threshold value is described in detail with reference to FIG. 10.

Referring to FIG. 10, if there is no profile having a reliability greater than or equal to the threshold value for the audio scene determined in operation 820, the processor 120 may determine a signal processing profile list related to the corresponding audio scene and output the signal processing profile list to the user in operation 1010.

As described above with reference to FIG. 3, the electronic device 101 may be an earphone-type electronic device, and the electronic device 101 may not include a display. In operation 1010, the processor 120 may output the list to the user through the electronic device 102 and receive a user input through the electronic device 102. For example, returning to FIG. 7, an operation of the processor 120 when an audio scene is determined as "Transportation" of the signal processing profile information 710 will be described.

According to an example embodiment, in the case of a signal processing profile related to the audio scene "Transportation," the processor 120 may output information on profile 1 721 and profile 2 722 among the profiles 721, 722, and 723 included in the signal processing profile information 710 to the user. According to an example embodiment, the processor 120 may output information on all profiles, for example, in the case of the signal processing profile information 710 of FIG. 7, profile 1 721, profile 2 722, and profile 3 723, included in the signal processing profile information 420 stored in the memory 130 to the user. Related profile information may be output to the user through the electronic device 102, and a UI for selecting a profile may be provided to the user.

According to an example embodiment, the processor 120 may determine a recommended profile for the predetermined corresponding profile such as the signal processing profile information 710 of FIG. 7, and output different visual effects for the recommended profile among profiles included in a profile list. For example, referring to FIG. 7, if the determined audio scene ID is "Transportation," the processor 120 may output the profile list including profiles 721, 722, and 723 as a user interface (UI) for user selection, and a visual effect of the predetermined profile 1 721 for "Transportation" as the recommended profile may be output differently.

According to an example embodiment, in operation 1020, the processor 120 may determine a target signal processing profile according to a user input. As described above, the processor 120 may output the profile list selection UI to the user through the electronic device 102 and determine the target signal processing profile according to input received from the user.

According to an example embodiment, in operation 1030, the processor 120 may store the signal processing profile selected by the user to the user selection history information 430 in association with the audio scene.

According to an example embodiment, the electronic device 101 may include input/output modules 150 and 155 configured to receive an ambient sound and output a sound in which the ambient sound is processed, an audio module 170 configured to process the ambient sound, a memory 130 configured to store computer-executable instructions and one or more of signal processing profiles 421, 423, 721, 722, and 723, and a processor 120 configured to execute the instructions by accessing the memory 130, wherein the instructions may be configured to determine an audio scene based on the ambient sound, determine a target signal processing profile corresponding to the audio scene, and process the ambient sound according to the target signal processing profile.

According to an example embodiment, the instructions may be configured to determine the audio scene according to at least one of a location and a feature of the ambient sound, based on the pre-trained learning model 410.

According to an example embodiment, the target signal processing profile may be determined based on a user input, and the instructions may be further configured to store a signal processing profile selected by the user for the audio scene to the user selection history information 430 in association with the audio scene.

According to an example embodiment, the instructions may be configured to determine a signal processing profile in which a reliability of a user selection for the audio scene is greater than or equal to a threshold value to be the target signal processing profile, referring to the user selection history information 430.

According to an example embodiment, the instructions may be configured to adjust at least one of a frequency band of the ambient sound and a gain, according to at least one of a sound source type of the ambient sound and a sound source direction of the ambient sound.

According to an example embodiment, the instructions may be further configured to seamlessly switch the target signal processing profile referring to the signal processing profile history information 440 as the ambient sound changes.

According to an example embodiment, the one or more of signal processing profiles 721, 722, and 723, respectively, may be configured as a combination of the ANC profile 750 for attenuating the ambient sound, and the ASE 760 profile for amplifying the ambient sound.

According to an example embodiment, the electronic device 101 may include at least one of a TWS, a headphone, and a headset.

According to an example embodiment, an operating method of the electronic device 101 may include receiving an ambient sound, determining an audio scene based on the ambient sound, determining a target signal processing profile corresponding to the audio scene among one or more signal processing profile, and processing the ambient sound according to the target signal processing profile.

According to an example embodiment, the determining of the audio scene may include determining the audio scene according to at least one of a location and a feature of the ambient sound, based on the pre-trained learning model 410.

According to an example embodiment, the target signal processing profile may be determined based on a user input, and the operating method of the electronic device 101 may further include storing a signal processing profile selected by the user for the audio scene to the user selection history information 430 in association with the audio scene.

According to an example embodiment, the determining of the target signal processing profile corresponding to the audio scene may include determining a signal processing profile in which a reliability of a user selection for the audio scene is greater than or equal to a threshold value as the target signal processing profile, referring to the user selection history information 430.

According to an example embodiment, the processing of the ambient sound according to the target signal processing profile may include adjusting at least one of a frequency band of the ambient sound and a gain, according to at least one of a sound source type of the ambient sound and a sound source direction of the ambient sound.

According to an example embodiment, an operation of seamlessly switching the target signal processing profile referring to the signal processing profile history information 440 as the ambient sound changes may be further included.

According to an example embodiment, the one or more of signal processing profiles 721, 722, and 723, respectively, may be configured as a combination of the ANC profile 750 for attenuating the ambient sound, and the ASE 760 profile for amplifying the ambient sound.

According to an example embodiment, the electronic device 101 may include at least one of a TWS, a headphone, and a headset.

According to an example embodiment, an operating method of an electronic device 101 may include receiving an ambient sound, determining an audio scene based on the ambient sound, determining a target signal processing profile corresponding to the audio scene referring to the user selection history information 430 among one or more signal processing profile, and processing the ambient sound according to the target signal processing profile.

According to an example embodiment, the determining of the target signal processing profile referring to the user selection history information 430 may include determining a signal processing profile in which a reliability of a user selection for the audio scene is greater than or equal to a threshold value as the target signal processing profile.

According to an example embodiment, the one or more of signal processing profiles 721, 722, and 723, respectively, may be configured as a combination of the ANC profile 750 for attenuating the ambient sound, and the ASE 760 profile for amplifying the ambient sound.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    an input/output module configured to receive an ambient sound and output a sound in which the ambient sound is processed;
    an audio module configured to process the ambient sound;
    a memory configured to store computer-executable instructions and one or more signal processing profiles; and
    a processor configured to execute the instructions,
    wherein the instructions, when executed by the processor, cause the electronic device to:
        determine an audio scene based on the ambient sound,
        receive a user input for selecting a target signal processing profile,
        determine the target signal processing profile corresponding to the audio scene, and
        process the ambient sound according to the target signal processing profile.

2. The electronic device of claim 1, wherein the instructions, when executed, further cause the device to determine the audio scene according to at least one of a location or a feature of the ambient sound, based on a pre-trained learning model.

3. The electronic device of claim 1,
    wherein the target signal processing profile is determined based on the user input, and
    wherein the instructions, when executed, further cause the device to store the target signal processing profile selected by a user for the audio scene in user selection history information in association with the audio scene.

4. The electronic device of claim 3, wherein the instructions, when executed, further cause the device to determine a signal processing profile, in which a reliability of the user selection of the audio scene is greater than or equal to a threshold, as the target signal processing profile, referring to the user selection history information.

5. The electronic device of claim 1, wherein the instructions, when executed, further cause the device to adjust at least one of a frequency band of the ambient sound or a gain, according to at least one of a sound source type of the ambient sound or a sound source direction of the ambient sound.

6. The electronic device of claim 1, wherein the instructions, when executed, further cause the device to seamlessly switch the target signal processing profile referring to signal processing profile history information according to changes in the ambient sound.

7. The electronic device of claim 1, wherein each of the one or more signal processing profiles is configured as a combination of an active noise cancellation (ANC) profile for attenuating at least part of the ambient sound, and an ambient sound enhancement (ASE) profile for amplifying at least part of the ambient sound.

8. The electronic device of claim 1, wherein the electronic device comprises at least one of a true-wireless stereo (TWS), a headphone, or a headset.

9. An operating method of an electronic device, the method comprising:
- receiving ambient sound;
- determining an audio scene based on the ambient sound;
- receiving a user input for selecting a target signal processing profile;
- determining the target signal processing profile corresponding to the audio scene among one or more signal processing profiles; and
- processing the ambient sound according to the target signal processing profile.

10. The method of claim 9, wherein the determining of the audio scene comprises determining the audio scene according to at least one of a location or a feature of the ambient sound, based on a pre-trained learning model.

11. The method of claim 9,
- wherein the target signal processing profile is determined based on a-the user input, and
- wherein the method further comprises storing the target signal processing profile selected by a user for the audio scene in user selection history information in association with the audio scene.

12. The method of claim 11, wherein the determining of the target signal processing profile corresponding to the audio scene comprises determining a signal processing profile, in which a reliability of the user selection of the audio scene is greater than or equal to a threshold, to be the target signal processing profile, referring to the user selection history information.

13. The method of claim 12, wherein the target signal processing profile is determined based on the user input in response to determining that the signal processing profile, of which the reliability of the user selection is greater than or equal to the threshold, does not exist.

14. The method of claim 11, further comprising:
- determining a signal processing profile list related to the audio scene;
- outputting the determined signal processing profile list; and
- determining the target signal processing profile according to a user input based on the determined signal processing profile list.

15. The method of claim 9, wherein the processing of the ambient sound according to the target signal processing profile comprises adjusting at least one of a frequency band of the ambient sound or a gain, according to at least one of a sound source type of the ambient sound or a sound source direction of the ambient sound.

16. The method of claim 9, further comprising seamlessly switching the target signal processing profile referring to signal processing profile history information according to changes in the ambient sound.

17. The method of claim 9, wherein each of the one or more signal processing profiles is configured as a combination of an active noise cancellation (ANC) profile for attenuating at least part of the ambient sound, and an ambient sound enhancement (ASE) profile for amplifying at least part of the ambient sound.

18. The method of claim 9, wherein the audio scene is classified according to a hierarchy.

19. A non-transitory computer-readable storage medium storing instructions that, when executed by a processor, cause the processor to perform the method of claim 9.

20. An operating method of an electronic device, the method comprising:
- receiving ambient sound;
- determining an audio scene based on the ambient sound;
- determining a target signal processing profile corresponding to the audio scene referring to user selection history information among one or more signal processing profiles; and
- processing the ambient sound according to the target signal processing profile.

* * * * *